United States Patent
Ziaylek et al.

(10) Patent No.: US 10,001,244 B2
(45) Date of Patent: Jun. 19, 2018

(54) ROBUST, ADJUSTABLE CONTAINER HOLDER

(71) Applicant: Michael P. Ziaylek, Yardley, PA (US)

(72) Inventors: Michael P. Ziaylek, Yardley, PA (US); W. Brian Mcginty, Huntingdon Valley, PA (US); James Jarozynski, Collingswood, NJ (US)

(73) Assignee: Michael P. Ziaylek, Yardley, PA (US)

( * ) Notice: Subject to any disclaimer, the term of this patent is extended or adjusted under 35 U.S.C. 154(b) by 0 days. days.

(21) Appl. No.: 15/335,794

(22) Filed: Oct. 27, 2016

(65) Prior Publication Data

US 2017/0114950 A1    Apr. 27, 2017

Related U.S. Application Data

(60) Provisional application No. 62/247,066, filed on Oct. 27, 2015.

(51) Int. Cl.
| | |
|---|---|
| *F16M 13/02* | (2006.01) |
| *F16M 13/00* | (2006.01) |
| *F16M 11/00* | (2006.01) |
| *F16M 11/04* | (2006.01) |
| *A47G 23/02* | (2006.01) |
| *A47K 10/18* | (2006.01) |
| *A47G 7/04* | (2006.01) |

(52) U.S. Cl.
CPC ............ *F16M 13/02* (2013.01); *F16M 13/00* (2013.01); *A47G 7/044* (2013.01); *A47G 23/0225* (2013.01); *A47K 10/185* (2013.01); *F16M 11/00* (2013.01); *F16M 11/041* (2013.01)

(58) Field of Classification Search
CPC ...... A47K 10/185; A47G 7/044; F16M 13/02; F16M 11/041; F16M 11/24; F17C 13/084; F17C 2205/0107; F17C 2205/0126; B60K 15/07; B60N 3/102; B60R 11/00; B60R 7/084; Y10S 248/905; Y10S 224/926
USPC ...... 248/302, 309.1, 311.2, 313, 316.1, 905; 211/71.01, 106, 175; 224/414, 425, 547
See application file for complete search history.

(56) References Cited

U.S. PATENT DOCUMENTS

| | | | | |
|---|---|---|---|---|
| 1,378,902 | A * | 5/1921 | Roehl | A47J 47/16 211/106 |
| 2,391,466 | A * | 12/1945 | Levin | B01L 9/00 126/256 |
| 2,451,281 | A * | 10/1948 | Elfner | A61F 15/001 221/46 |
| 2,470,890 | A * | 5/1949 | Goodpasture | A47K 10/185 248/302 |

(Continued)

*Primary Examiner* — Stanton L Krycinski
*Assistant Examiner* — Taylor L Morris
(74) *Attorney, Agent, or Firm* — Fox Rothschild LLP; Robert J. Sacco; Carol E. Thorstad-Forsyth (57) ABSTRACT

An adjustable container holder includes two rods that can be connected by a tube, where the tube and the two rods can together embrace a container. Each rod is attachable to a L-shaped support bracket by means of a clamp, where the rod is sandwiched between the clamp and the L-shaped support bracket. Each of the L-shaped brackets has apertures therein for mounting the bracket to a surface such as a wall or a floor. The tube is adjustable so that the width of the container holder can be changed. Once the width of the container holder is adjusted, the container holder can be fixed by mounting the L-shaped brackets to the surface.

5 Claims, 6 Drawing Sheets

(56) References Cited

U.S. PATENT DOCUMENTS

| | | | | |
|---|---|---|---|---|
| 2,626,119 A * | 1/1953 | Crosby | A47F 5/01 | 221/46 |
| 3,017,598 A * | 1/1962 | Low | H01R 13/62 | 248/316.1 |
| 3,089,597 A * | 5/1963 | Kaplan | A47K 10/185 | 221/46 |
| 3,365,228 A * | 1/1968 | Hay | A47J 47/16 | 211/75 |
| 3,511,461 A * | 5/1970 | Clark | A47G 7/044 | 248/229.1 |
| 3,614,982 A * | 10/1971 | Krizman | F01P 11/029 | 123/41.27 |
| 3,955,826 A * | 5/1976 | Riedesel | B62B 3/10 | 211/28 |
| 4,036,369 A * | 7/1977 | Eisenberg | A47B 45/00 | 108/102 |
| 4,697,776 A * | 10/1987 | Edson | A47F 5/01 | 248/302 |
| 4,813,535 A * | 3/1989 | Radocha | A47F 5/0823 | 206/362 |
| 4,867,318 A * | 9/1989 | Robson | A47B 81/068 | 211/184 |
| 4,949,924 A * | 8/1990 | Carmody | A47G 7/044 | 248/215 |
| 5,038,689 A * | 8/1991 | Duffy | A47B 65/00 | 108/108 |
| 5,064,161 A * | 11/1991 | Anderson | A47B 81/06 | 248/317 |
| 5,082,125 A * | 1/1992 | Ninni | A47F 5/0823 | 108/61 |
| 5,320,319 A * | 6/1994 | Winger | A47G 7/044 | 248/312.1 |
| 5,368,267 A * | 11/1994 | Howard | A47G 7/044 | 248/208 |
| 5,711,502 A * | 1/1998 | Emalfarb | A47G 7/044 | 248/302 |
| 5,713,499 A * | 2/1998 | Daniel | B65F 1/0053 | 220/23.4 |
| 5,738,319 A * | 4/1998 | Grassi | A47G 7/044 | 248/215 |
| 5,836,494 A * | 11/1998 | Grunsted | B60R 9/06 | 224/495 |
| 5,853,158 A * | 12/1998 | Riggle | A47G 23/0225 | 248/103 |
| 6,027,000 A * | 2/2000 | Sterzel | B60R 7/02 | 211/182 |
| 6,029,580 A * | 2/2000 | Alfonso | F16M 13/02 | 108/26 |
| 6,073,899 A * | 6/2000 | Omrani | A47K 10/185 | 248/311.2 |
| 6,158,704 A * | 12/2000 | O'Neill | A47B 81/06 | 248/317 |
| 6,460,817 B1 * | 10/2002 | Bosson | A47B 21/0314 | 248/316.1 |
| 6,607,088 B2 * | 8/2003 | Cestrone | B65F 1/141 | 220/23.86 |
| 6,986,491 B2 * | 1/2006 | Anderson | F16M 11/041 | 248/317 |
| 7,029,133 B2 * | 4/2006 | Challis | F16M 11/14 | 248/551 |
| 7,185,865 B1 * | 3/2007 | Patrick | A47K 10/185 | 211/71.01 |
| 7,344,112 B2 * | 3/2008 | Nice | B67D 7/845 | 248/125.1 |
| 7,407,177 B2 * | 8/2008 | Darling, III | A61G 1/013 | 280/47.18 |
| 7,607,625 B2 * | 10/2009 | Wang | F16M 11/24 | 108/50.02 |
| 7,735,800 B2 * | 6/2010 | Lunato | A47G 7/044 | 248/146 |
| 7,891,318 B2 * | 2/2011 | Wilson | A01K 5/0114 | 119/464 |
| 8,550,263 B2 * | 10/2013 | Martin | A47K 1/08 | 211/105.3 |
| 2004/0129851 A1 * | 7/2004 | George | A47F 7/00 | 248/309.1 |
| 2005/0167551 A1 * | 8/2005 | Leroux | B65F 1/141 | 248/153 |
| 2006/0175474 A1 * | 8/2006 | Lawson | D06F 95/002 | 248/99 |
| 2013/0270292 A1 * | 10/2013 | Sporre Thorburn | A47K 10/18 | 221/283 |
| 2014/0231600 A1 * | 8/2014 | Carmichael | A47B 23/042 | 248/121 |

\* cited by examiner

ROBUST, ADJUSTABLE CONTAINER HOLDER

CROSS-REFERENCE TO RELATED APPLICATIONS

This patent document claims priority to U.S. Provisional Patent Application No. 62/247,066 filed Oct. 27, 2015, the disclosure of which is incorporated herein by reference in full.

FIELD OF THE INVENTION

This disclosure relates to the field of container holders and particularly adjustable container holders installable on a horizontal surface or a wall.

BACKGROUND OF THE INVENTION

Normally a container holder, such as a gas can holder is made specially for a certain size container. Whereas a smaller size container may fit into a container holder made for a larger size, it tends to be unstable. This creates a dangerous situation particularly in a moving vehicle such as a fire truck or a boat, in which the container must robustly fit into the container holder so that it will not fall out of the container holder or cause spill during the movement of the vehicle.

This document describes a system that addresses the issues described above and other issues too.

SUMMARY OF THE INVENTION

An adjustable container holder includes a first and second L-shaped support bracket, a first and a second rod, a first and second clamp, and a tube. Each of the first and second L-shaped brackets has a first and a second leg at a right angle to each other. Each of the first and second rods has a first section for attachment to the first leg of the first L-shaped bracket, and a second section extending from the first section and forming a U-shaped frame for holding a container. The first and second clamps each attaches the first section of the first or second rod to the first leg of the first or second L-shaped bracket. The tube connects the second sections of the first and second rods so that they embrace the container.

The tube is adjustable so that the width of the container holder can be changed. The tube of the container holder has two opposing ends, each receiving one of the first and second rods. The width of the container is changeable based on the extent that each of the first and second rod is inserted into the tube. Optionally, the width of the container holder is also changeable based on adjusting the length of the tube.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

Figure 1:
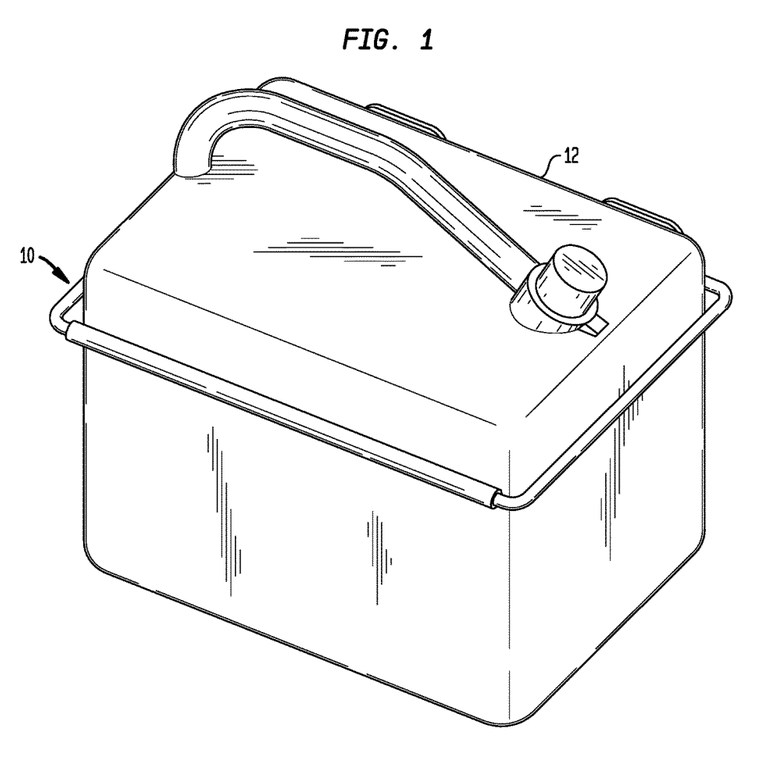
FIG. 1 is a front perspective view of a gas can holder with a gas can therein according to a preferred embodiment.
Figure 2:
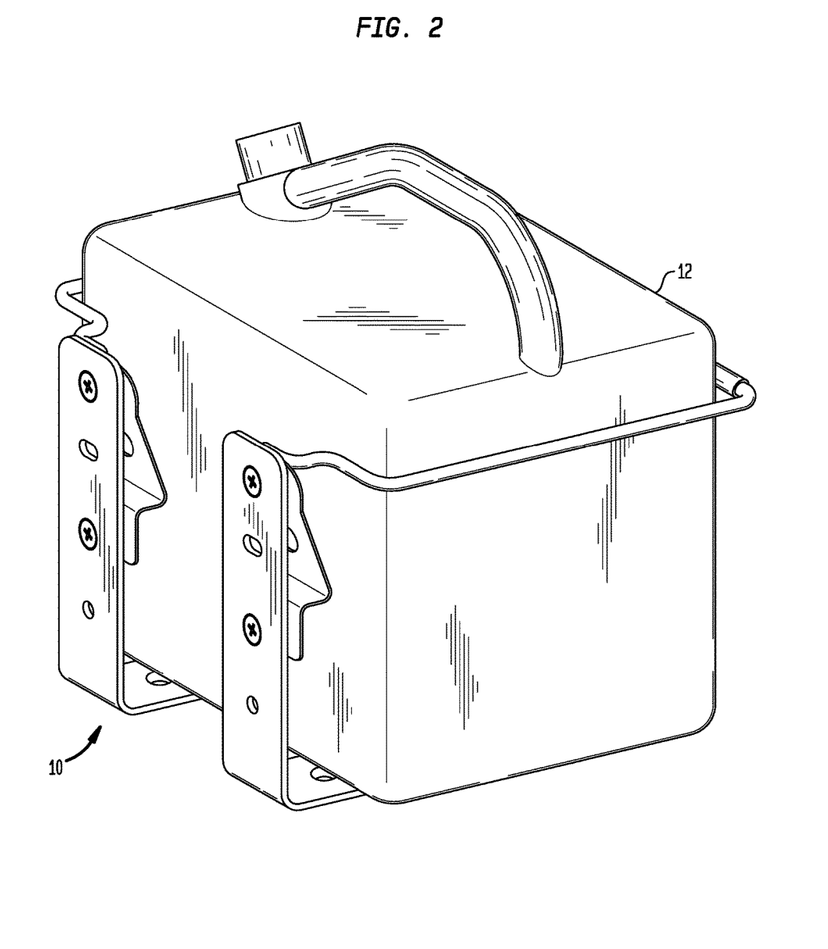
FIG. 2 is a rear perspective view of the container holder and the gas can in FIG. 1.
Figure 3:
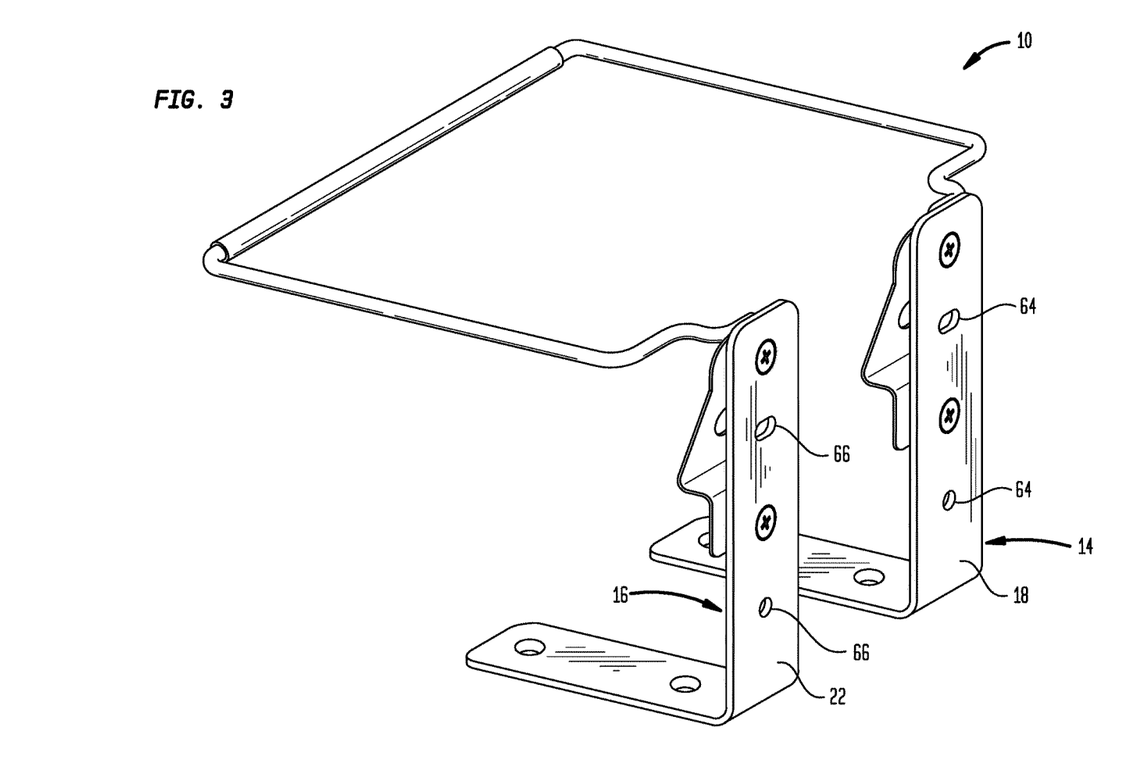
FIG. 3 is a rear perspective view of the container holder in FIG. 1.
Figure 4:
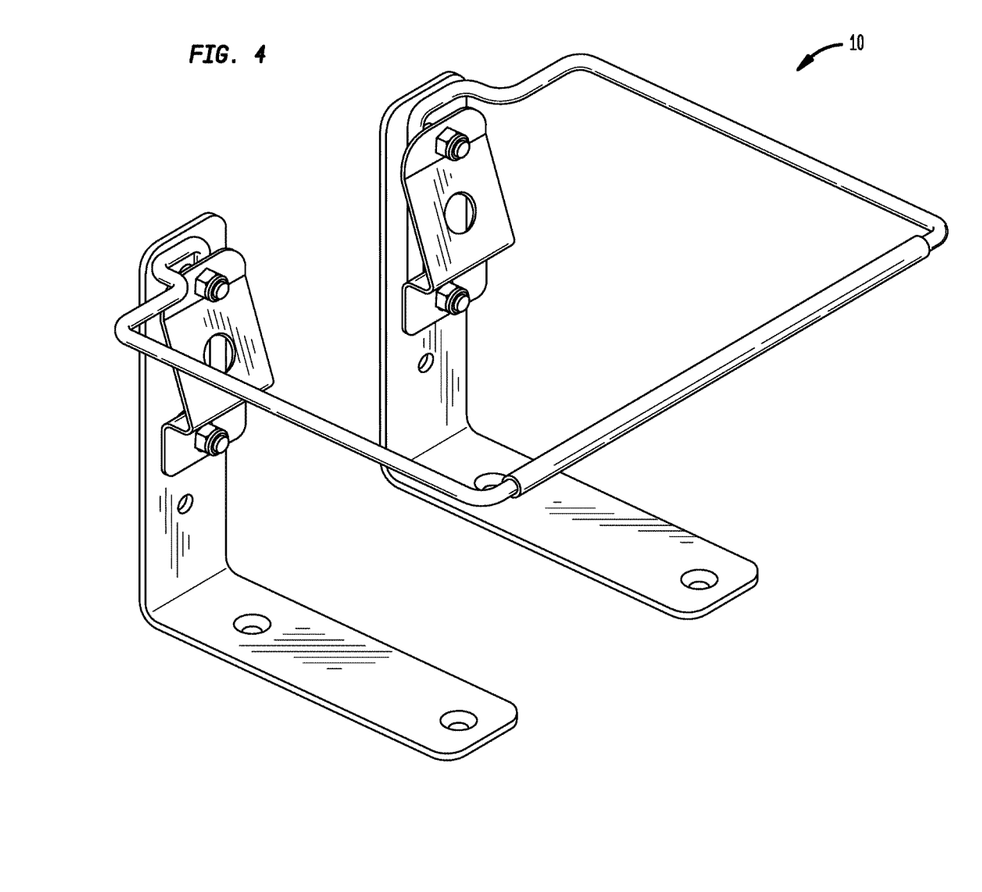
FIG. 4 is a front perspective view of the container holder in FIG. 1.

In a preferred embodiment, a container holder 10 is intended to hold large containers such as one- and two-gallon gasoline/fuel container 12, as shown in FIGS. 1 and 2. FIGS. 3 and 4 are rear and front perspective views respectively of the container holder, which is explained in detail below, with reference to FIG. 5.

Figure 5:
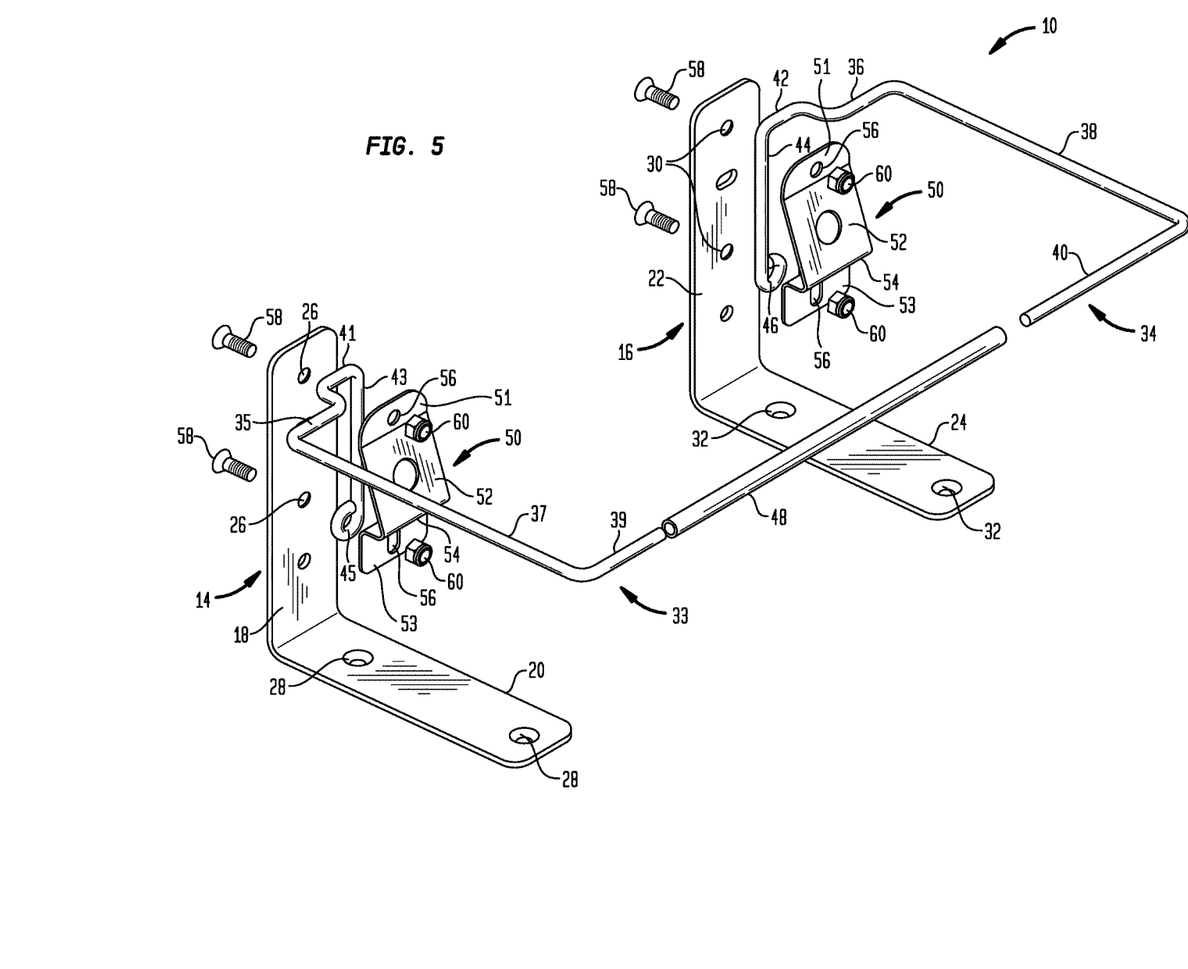
FIG. 5 is an exploded view of the container holder in FIG. 1.

As shown in FIG. 5, the container holder 10 in the preferred embodiment includes two metal L-shaped support brackets: the first and second L-shaped brackets 14 and 16, each having two legs: the first and second legs such as 18, 20 or 22, 24. The two legs 18, 20 of the first L-shaped bracket 14 are formed at a right angle to each other; so are the two legs 22, 24 of the second L-shaped bracket 16.

The container holder 10 also includes two metal rods, namely, first and second rods 33 and 34. Each rod has two sections. For rod 33, the first section (formed by 41, 43) is attachable to the leg 18 of the L-shaped bracket 14, and the second section (formed by 35, 37, 39) extends from the first section and is a U-shaped frame for holding a container. Similarly, for rod 34, the first section (formed by 42, 44) is attachable to the leg 22 of the L-shaped bracket 16, and the second section (formed by 36, 38, 40) is also a U-shaped frame for holding a container.

The container holder 10 further includes two metal clamps 50, each clamp is used for attaching one of the first and second rods 33, 34 to a corresponding L-shaped bracket 14 or 16. In FIG. 5, a clamp 50 attaches the first section (formed by 41, 43) of the first rod 33 to leg 18 of the first L-shaped bracket 14. Similarly, another clamp 50 also attaches the first section (formed by 42, 44) of the second rod 34 to leg 22 of the second L-shaped bracket 16.

To attach a rod to the L-shaped bracket, the rod can be sandwiched between the L-shaped bracket and the clamp. Each clamp 50 can be used as a washer and fastened to a leg of the L-shaped bracket via bots and nuts. For example, a clamp can have three sections: a first tab section 51, an inclined central section 52, and a second tab section 53. Each tab section has an aperture 56 that aligns with a corresponding aperture on the L-shaped bracket, such as aperture 26 and 30. The clamp can be fastened to the L-shaped bracket by means of a bolt 58 that passes through the apertures 56 and 26 (for the first L-shaped bracket 14) or the apertures 56 and 30 (for the second L-shaped bracket 16), and a nut 60 tightens the L-shaped bracket, the rod and the clamp altogether.

Additionally, the first section of each of the first and second rods, for example, the section 43 in the first rod 33, has a loop 45 that allows the fastening bolt 58 to pass through, attaching the second tab section 53 of the clamp 50 to the leg 18 of the L-shaped bracket 14, thus securing the rod 33 robustly to the L-shaped bracket. Similarly, the section 44 of the second rod 34 can has a loop 46 that allows the fastening bolt 58 to pass through, attaching the clamp 50 to the leg 22 of the L-shaped bracket 16, thus securing the rod 34 robustly to the L-shaped bracket and preventing the rod from any longitudinal or lateral movement relative to the L-shaped bracket.

Figure 6:
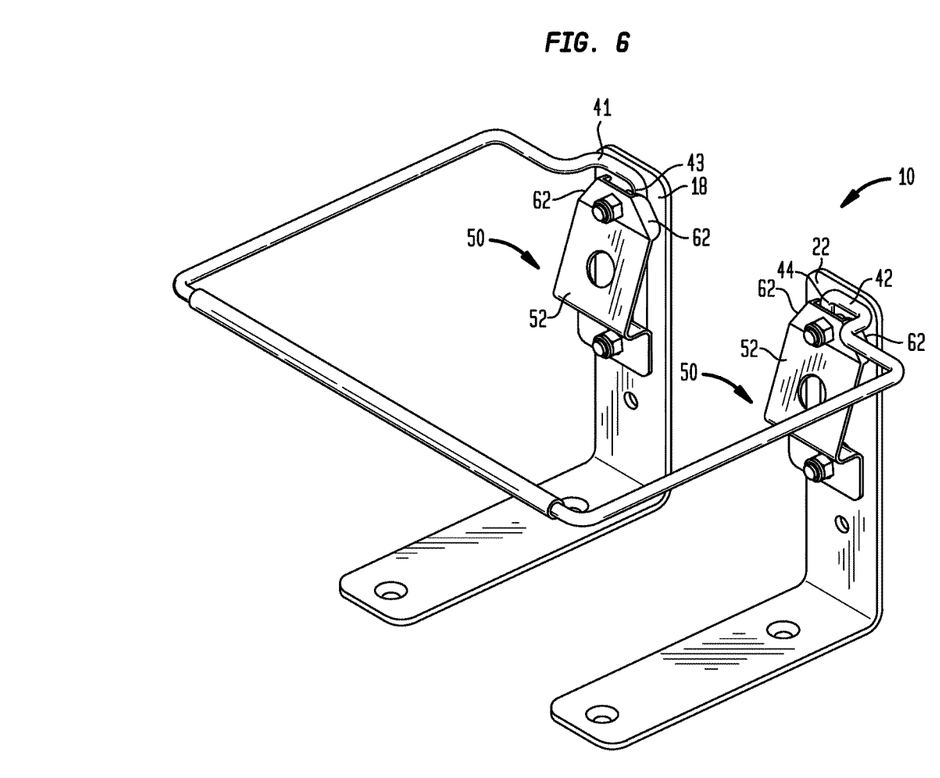
FIG. 6 is a right perspective view of a variation of the container holder in FIG. 1.

Additionally, the clamp 50 secures the rods 33, 34 robustly to the corresponding L-shaped bracket 14, 16 via bended corners of the clamp. In FIG. 6, the corners 62 of the first section of the first and second clamps are bent inward towards the legs of the L-shaped brackets 18, 22 such that the longitudinal portion of the first section of the first and second rods 43, 44 can be secured between the clamp and the L-shaped brackets, and between the corners 62 of the clamp 50 without lateral movement.

Returning to FIG. 5, in the preferred embodiment, the inclined central section 52 of the clamp 50 is in the shape of an angled/ramped guide that moves further away from the leg 18, 22 of the L-shaped brackets 14, 16 as it extends from the first tab section 51 to the second tab section 53 of the clamp. When the central section 52 meets the second tab section 53 at a bend 54, it has extended beyond the bolts/nuts 58, 60 thereby protecting the containers from scraping along the fasteners. The inclined central section will also help guide the containers into the holder.

The container holder further includes a plastic tube 48 that fits over opposing ends of rods 33, 34 to allow for linear adjustment in width prior to mounting. As shown in FIG. 5, the tube 48 can be plastic and it connects the second section (formed by 35, 37, 39) of the first rod 33 to the second section (formed by 36, 38, 40) of the second rod 34 so that the tube and the second sections of the first and second rods embrace the container.

In the preferred embodiment, the tube 48 can be adjustable so that the width of the container holder can be changed to accommodate a large range of containers. This can be accomplished in different ways. For example, as shown in FIG. 5, the tube 48 has two opposing ends, each can receive an end of each rod, for example, the end 39 of the first rod 33 can be inserted into one end of the tube. Similarly, the end portion 40 of the second rod 34 can be inserted into the opposing end of the tube. In a non-limiting example, the diameter of the rod is 3/16" and the diameter of the tube is 1/4". By adjusting the extent that the rods are inserted into the tube, the width of the container holder can be adjusted. In another example, the tube can be pre-cut in different length to accommodate different width of the container holder.

In a non-limiting example, to accommodate a two-gallon gas can, the tube is 8 inches in length, and by adjusting the extent that the rod is inserted into the tube, the width of the container holder ranges from 8¾" to 14¾". In another example, the depth of the container holder, measured between section 35 and 39 of the first rod 33 is 6¾". In another example, the height of the rods 33, 34 is 8¾" from the floor, or the second legs 20, 24 of the L-shaped brackets. Other sizes may also be possible.

Once the container holder is adjusted to the appropriated length for its intended use, for example, 10 inches for a two-gallon can, the lateral distance between the L-shaped brackets 14 and 16 can be set by mounting the brackets to a surface of a wall or a floor. For example, in the preferred embodiment, in FIG. 3, the L-shaped brackets 14, 16 can each have a pair of two apertures 64 or 66 in the leg 18 or 22 for mounting the bracket to the wall or a vertical surface to secure the container in a raised position. As shown in FIG. 5, the other leg 20, 24 of the L-shaped brackets each can also have a pair of two apertures 28 or 32 for mounting the bracket to the floor or a horizontal surface, such as the inside floor of a fire truck side compartment.

The illustrated embodiments specific materials are disclosed for various components of the container holder, for example, the rods, the L-shaped brackets and the clamps are steel metal for maximum support and powder-coated for added protection, and the tube is plastic. However, it should be noted that such materials are merely illustrative for achieving a desired performance in a desired application. As the application varies, other materials may be substituted. Further, the sizes of container holder can be different to suit a wide range of applications, such as storage options, from securing a single oddly-shaped container to stowing multiple gallon containers all in one place, to hand soap dispensers and/or degreaser dispensers.

Other advantages of the present invention can be apparent to those skilled in the art from the foregoing specification. Accordingly, it be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

The invention claimed is:

1. An adjustable container holder apparatus comprising:
   a first L-shaped bracket having a first and a second leg at a right angle to each other, wherein the second leg is positioned to be in contact with a surface of a container for supporting the container;
   a second L-shaped bracket having a first and a second leg at a right angle to each other, wherein the second leg is positioned to be in contact with the surface of the container for supporting the container;
   a first rod having a first section for attachment to the first leg of the first L-shaped bracket with the first section having a loop, and a second section extending from the first section and forming a U-shaped frame for holding the container, the second section having a free end;
   a second rod having a first section for attachment to the first leg of the second L-shaped bracket with the first section having a loop, and a second section extending from the first section and forming a U-shaped frame for holding the container, the second section having a free end;
   a first clamp for attaching the first section of the first rod to the first leg of the first bracket the first clamp comprising a first tab section having a first aperture therein, a central section extending from the first tab section, and a second tab section extending from the central section, the second tab section having a second aperture therein, wherein:
   the first section of the first rod is sandwiched between the first leg of the first bracket and the first clamp, and
   the first clamp is attachable to the first leg of the first bracket by means of at least a first bolt, wherein the first bolt passes through at least one aperture in the first clamp, the first leg of the first bracket and the loop of the first rod;
   a second clamp for attaching the first section of the second rod to the first leg of the second bracket, the second clamp comprising a first tab section having a first aperture therein, a central section extending from the first tab section, and a second tab section extending from the central section, the second tab section having a second aperture therein, wherein:
   the first section of the second rod is sandwiched between the first leg of the second bracket and the second clamp, and
   the second clamp is attachable to the first leg of the second bracket by means of at least a second bolt, wherein the second bolt passes through at least one aperture in the second clamp, the first leg of the second bracket and the loop of the second rod; and, a tube for connecting the free end of the second section of the first rod to the free end of the second section of the second rod so that the tube and the second sections of the first and second rods embrace the container, wherein:

the tube has two opposing ends for receiving the second sections of the first rod and second rods, respectively, the tube is adjustable so that the width of the container holder is changeable based on the extent that each of the first and second rod is inserted into the tube.

2. The apparatus of claim 1, wherein the width of the container holder is changeable based on adjusting the length of the tube.

3. The apparatus of claim 1, wherein the central section of the first and second clamps each has a ramped shape and is configured to extend beyond the bolts thereby protecting the container from damaging contact on the bolts, and further wherein the central section guides a container into the holder.

4. The apparatus of claim 3, wherein two corners of each of the first section of the first clamp and the first section of the second clamp are bent inward towards the first section of the first and second rods to secure the first section of the first rod in place between the two corners of the first section of the first clamp and to secure the first section of the second rod in place between the two corners of the first section of the second clamp.

5. The apparatus of claim 4, wherein the first or second leg of the first and second L-shaped brackets has at least two apertures therein for mounting the first or the second leg to a surface.

* * * * *